Patented June 9, 1942

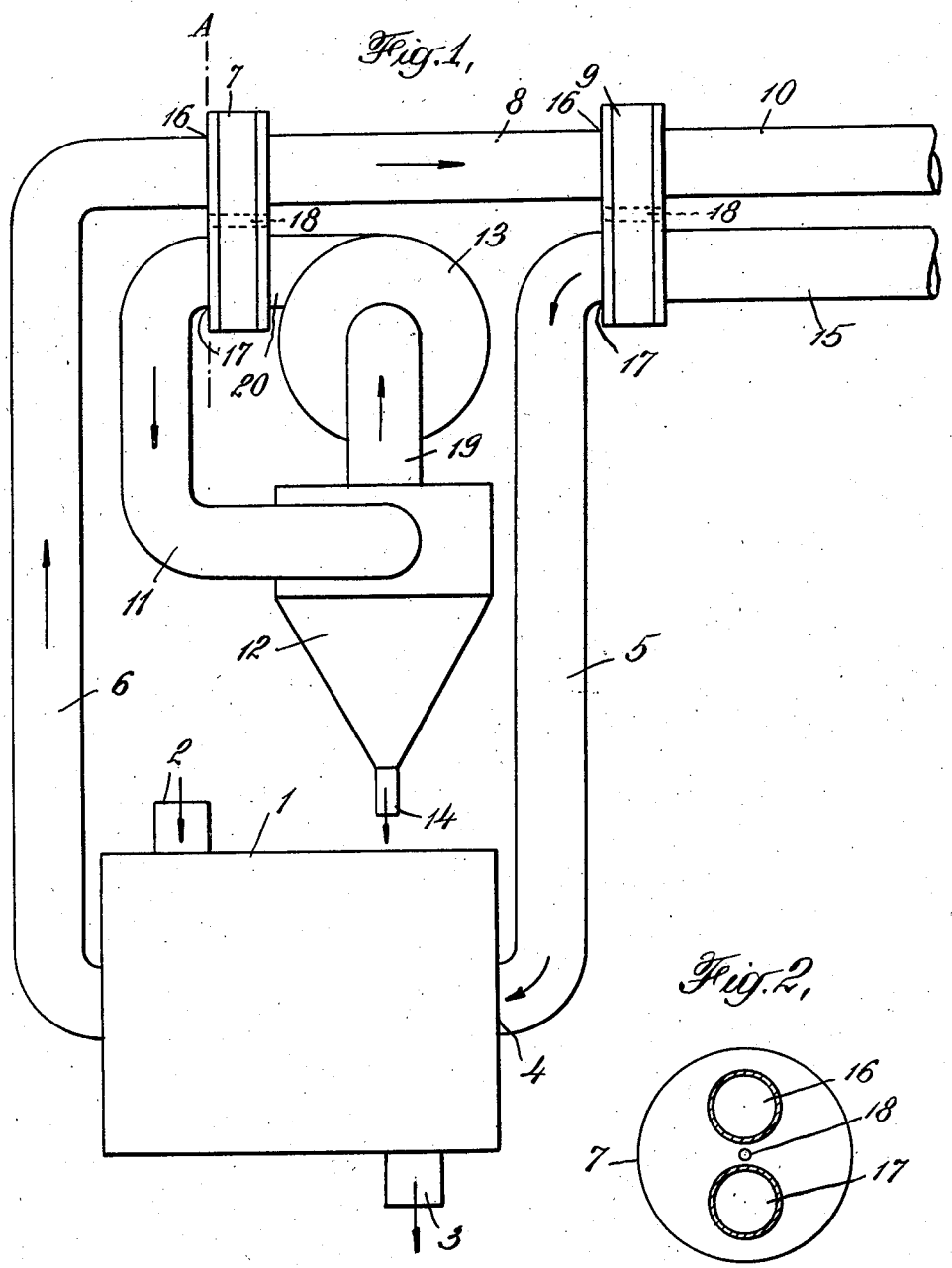

2,285,804

UNITED STATES PATENT OFFICE 2,285,804

REGENERATION OF CATALYTIC MATERIALS AND APPARATUS THEREFOR

Oliver F. Campbell, Whiting, and Harry L. Pelzer, Chesterton, Ind., assignors to Sinclair Refining Company, New York, N. Y., a corporation of Maine Application October 23, 1940, Serial No. 362,429

8 Claims. (Cl. 252—237)

This invention relates to the recovery of finely divided solids from a suspension of said solids in gaseous media and, more particularly, relates to a novel method and apparatus adapted to the continuous handling of large volumes of such gaseous media carrying in suspension relatively large proportions of solids. The invention is particularly applicable to the recovery of catalyst used in the catalytic treatment of hydrocarbon oil for the production of motor fuel or the like.

In our application Serial No. 362,428, filed October 23, 1940, concurrently herewith, we have described and claimed novel process and apparatus for regenerating spent catalyst or like material by bringing said material into intimate contact with a reacting gaseous medium and recovering the finely divided particles of catalyst or the like suspended in the effluent gases from the regenerating process by first subjecting said gases to a preliminary conventional separating operation and then to a filtering operation whereby any residual suspended particles remaining in the effluent gases after the preliminary separation are deposited on alternate sections of a continuously operating filter. The solid material thus deposited is then picked up and returned to the regenerating zone by a stream of reacting gaseous medium, alternately passing in the reverse direction through the sections of the filtering medium on its way to the regenerating zone. In said application we have also described and claimed a novel arrangement of apparatus and process steps whereby such step may advantageously and economically be combined with a heat exchange between the hot effluent gases and the cooler reacting gaseous medium to be supplied to the regenerating treatment.

Our present invention comprises improvements in such process and apparatus, particularly with respect to the preliminary separating operation, whereby greater efficiency and ease of operation of the process in its entirety is obtained. Though the invention is particularly applicable to the process and apparatus of the above-referred-to application, and is illustrated herein with particular reference to such use, its utility is by no means limited thereto. It may advantageously be employed generally for the recovery of suspended solids from gaseous media, as will fully appear from the following description thereof.

Catalysts and the like, customarily used in the treatment of hydrocarbon oils at elevated temperatures, require very frequent regeneration. During such treatment this material becomes contaminated with carbon or heavy hydrocarbon polymerization products, or both, and rapidly loses its effectiveness. To restore its effectiveness it is necessary to remove such impurities and this is usually accomplished by oxidation or burning.

One of the disadvantages encountered in such catalytic processes has been the relatively high loss of catalyst largely due to the failure to effect complete recovery of the suspended catalyst from the large volumes of effluent gases. The cost of suitable catalyst for this purpose is unusually high and this fact, coupled with the necessary frequency of regeneration, makes it imperative that the loss of catalyst per cycle of operation be reduced to an absolute minimum.

The regeneration of these catalytic materials may be satisfactorily carried out in one of a number of well-known types of burners such, for instance, as the Nichol-Herreschoff or equivalent apparatus, advantageously of a continuously-operating type. The oxidizing or burning is effected by subjecting the contaminated material in a relatively finely divided condition to intimate contact with air or other oxidizing gas at an elevated temperature. For example, in the Nichol-Herreschoff burner, the contaminated material is caused to pass downwardly in thin layers through the burner, generally countercurrent to a stream of air. In its downward passage the catalyst or the like is raked or otherwise agitated to insure uniform heating and intimate contact with the air.

Many other types of regenerators suitable for this purpose are well known and readily available; for example, we may use a conventional type regenerator wherein a heat-exchanging medium such as fused salt is passed in heat exchange relation with the burning zone so as to supply heat thereto or absorb heat therefrom as required to maintain the desired temperature.

Though this is a generally effective means of regenerating such material, a substantial amount of the finely divided catalyst becomes suspended in the gaseous medium and is carried off with the products of combustion. The amount of catalyst thus carried off in suspension in the stack gases is increased by reason of the necessary agitation of the material during regeneration to insure uniform contact with the oxidizing gas and avoid overheating.

One of the difficulties encountered in previous attempts to recover suspended particles of the catalyst from large volumes of effluent gases has been the inability of available means to accomplish economically anything approaching complete recovery of the extremely fine particles. Efforts to effect more complete recovery have resulted in greatly decreased capacity. In previously available apparatus, it has not been commercially feasible to recover the last 5 or 10% of the suspended solids. In accordance with our present invention, substantially complete recovery of the suspended catalyst is readily and economically effected.

By reason of the nature of these processes, continuous operation is highly desirable. The use of filters or the like therewith, which require frequent interruption of their operation for cleaning, is a decided disadvantage as in such case duplicate apparatus must be provided for alternate use during the cleaning operation. Continuously-operating filters of the rotary type are available but such filters usually require the continuous removal of the deposited solids from the filtering medium thereof by alternately blowing jets of air in the reverse direction through isolated portions of such filtering medium. Where substantially complete ultimate recovery of the finely divided solids is required, such continuous filters have been generally unsatisfactory as the previously deposited fine solid particles become suspended in the air used for cleaning the filter medium and no practical means has been available for recovering the suspended particles from this air.

In our above-referred-to application, we have disclosed an improved method of utilizing such continuous filters in connection with the regeneration of catalyst or the like by contact with gaseous media, whereby the gaseous media on its way to the regenerating zone is continuously passed through alternate sections of the filter medium to remove the deposited solids therefrom. These solid particles are thus returned to the regenerating zone in suspension in the gaseous media and no separating step is required for their ultimate recovery.

While the said method is admirably adapted to the continuous and substantially complete recovery of relatively small amounts of suspended solids from such effluent gases it is usually desirable to subject such gases to a preliminary separating operation, whereby the major portion of the solid material is directly recovered when relatively large quantities of suspended material are present in the effluent gases.

This preliminary separating operation may be effected by passing the effluent gases from the burner through a conventional cyclone-type separator. However, the effectiveness of the operation of separators of this type depends among other things upon the velocity of the gases passing therethrough. If the volume of effluent gases from the burner, for instance, is subject to fluctuations, the efficiency of the separator will be correspondingly effected. Further, the maximum efficiency of such separators is dependent upon an optimum velocity of the gases passing therethrough. Consequently, with such arrangement, the effectiveness of a separator of this type is to a considerable degree dependent upon the operating conditions of the burner.

In accordance with our present invention, the operation of the cyclone separator used in the preliminary recovery operation is made wholly independent of the operating conditions of the burner or the like, or the volume or velocity of the stream of effluent gases, by transferring the suspended solid particles from the stream of effluent gases to an independent stream of gases flowing continuously at an optimum velocity, advantageously in a closed cycle, and effecting the preliminary recovery of the suspended particles from this independent gas stream, as hereinafter more fully described.

The transfer of the suspended solid particles from the effluent gases to the independent stream of gases is accomplished in a unique manner by means of a filter of the continuous rotary type. The stream of effluent gases carrying the suspended solids and the above-mentioned independent stream of gases are caused to pass alternately in opposite directions through isolated sections of the filter medium of the rotary filter whereby suspended solids are deposited on one section of the filter medium as the effluent gases pass therethrough and are subsequently picked up and carried out of the filter by the independent stream of gases as it passes in the opposite direction through said section of the filter medium.

Included within the path of this independent stream of gases is a cyclone or equivalent separator by means of which at least the major portion of the solid particles carried out of the filter by the independent stream of gases is recovered therefrom.

This independent gas stream also includes gas-propulsion means whereby the gases of the stream may be maintained at an optimum velocity wholly independent of the velocity of the stream of effluent gases.

Where the independent gas stream is cyclic, the gases of the cycle, after the major portion of the suspended solid has been recovered therefrom, leave the cyclone separator and re-pass through the rotary filter. Any residual solids remaining in suspension in such gases are deposited on the reverse side of the filter medium from whence they are carried off by the stream of effluent gases, alternately flowing in the opposite direction therethrough, and are subsequently recovered therefrom together with any suspended material, not previously separated from the effluent gases, by a final separating operation.

The final separating operation whereby any residual solids are recovered from the stream of effluent gases leaving the preliminary separator consists in transferring the residual solids remaining in the effluent gases to a stream of gases passing to the burner or the like, hereinafter referred to as reactive gases. This transfer of the residual solids to the stream of reactive gases passing to the burner or the like is accomplished by passing such effluent gases through a second continuously-operating rotary filter, which may be substantially identical with the preliminary filter except that a stream of the reactive gases, for instance air for combustion to be supplied to the regenerating operation, is used instead of the independent cycle of gases to carry off the solid material deposited on the filter medium. Similarly, such stream of reactive gases on its way to the regenerating zone and the partly cleaned stream of effluent gases are caused to pass alternately and in reverse directions through isolated portions of the filter medium whereby the stream of reacting gases carries off in suspension the solid particles previously deposited on the filter medium from the effluent gases. These residual solid particles are returned to the regenerating zone suspended in the stream of reacting gases.

The filter medium of the final filter should be sufficiently fine to retain the smallest particles which it is desired to recover. However, the filter medium of the preliminary filter need be only sufficiently fine to recover the major portion of the suspended solids. It is usually desirable to use a filter no finer than necessary so as to reduce the resistance to the flow of gases therethrough.

The invention will be further described and illustrated with reference to the accompanying drawing of which:

Figure 1 represents diagrammatically a side-view of one arrangement of apparatus wherein the process of our invention may advantageously be carried out and Figure 2 similarly represents a cross-sectional view along the line A—A of Figure 1.

The regeneration furnace or burner is diagrammatically represented in the drawing as indicated by the numeral 1. The spent catalyst to be regenerated is introduced into the burner at 2 and the regenerated catalyst is withdrawn at 3. Where the burner is of the continuous type this introduction and withdrawal of the catalyst is continuous.

The reactive gas which in the present illustration may be air, preferably preheated, for burning the combustible impurities contained in the spent catalyst, is introduced to the burner at 4 through the conduit 5. The effluent gases, i. e. products of combustion, carrying fine particles of the catalyst in suspension, leave the burner through the conduit 6 and pass to a preliminary continuously-operating filter diagrammatically indicated in the drawing at 7. From the preliminary filter 7 the partially cleaned products of combustion pass through conduit 8 to the final filter 9 and leave the latter through conduit 10.

The continuously operating filters 7 and 9 may be of the conventional rotary type comprising a revolving disc or drum of filtering medium and so designed that an isolated portion of the filtering medium is constantly across the path of the stream of the effluent gases passing therethrough and another portion of the filtering medium is isolated from the zone through which the effluent gases are passing, with provisions for passing a second stream of gas, i. e. the cyclic gases or air, through the second isolated portion of the filtering medium without substantial commingling of the two streams of gases. Continuously operating filters of this type are well known in the art and need not be here described in greater detail.

A second conventional type of filter, admirably adapted for this purpose, is one comprising a plurality of segmental chambers containing permeable beds of granular or porous filtering medium, such chambers being adapted to rotate about a common axis so that the beds of filtering medium alternately lie across the path of the respective streams of gases.

In the operation of filters of this type, the two streams of gases are alternately passed through sections of the filtering medium in opposite directions so that the finely-divided solids deposited on one section of the filter medium will be carried off therefrom by the second stream of gas subsequently passing in the opposite direction through that section of the filtering medium.

In the illustrated apparatus, the solid particles deposited on the filtering medium, not shown in the drawing, of filter 7 from the effluent gases are continuously removed from the filtering medium by a stream of gases flowing in a cyclic path through the preliminary filter 7, leaving said filter through conduit 11 and passing to and through cyclone separator 12 wherein the major portion of the suspended matter carried by the cyclic gas stream is separated therefrom and the resulting partly-cleaned gases returned through conduits 19 and 20 by means of blower 13 to the filter 7, thus completing the closed cycle. The solid material separated out in the separator 12 is withdrawn therefrom at 14 and may be combined with the regenerated material withdrawn from the burner at 3.

Reactive gaseous medium to be supplied to the burner, and pass therethrough in contact with the material to be regenerated, is supplied through conduit 15 by means of a conventional blower or the like, not shown, and similarly passes through the final filter 9, in the reverse direction through isolated sections of the filtering medium therein through which the effluent gases have previously passed, thus carrying off from the filtering medium solid particles deposited thereon from the effluent gases passing to the filter through conduit 8. The solid particles picked up by the stream of reactive gaseous medium are thereby returned to the burner through the conduit 5.

As previously indicated, Figure 2 of the drawing represents diagrammatically an endview of the identical filters 7 and 9. The streams of gas entering and leaving these filters pass through the openings 16 and 17 in the stationary housings of said filters. The rotating members of these filters, not shown in the drawing, are adapted to rotate about the axis 18.

In the operation of the process, the effluent gases, resulting from the regenerating reaction or the like and carrying in suspension the solids to be recovered, pass to the filter 7 through conduit 6 and aperture 16. Within the filter these effluent gases pass through an isolated section of the filter medium lying across their path on which the major portion, at least, of the suspended solid is deposited. As the filter medium is slowly rotated, by means not shown in the drawing, that isolated portion thereof through which the effluent gases have passed and on which solid particles have been deposited is moved out of the stream of effluent gases and into the path of the stream of cyclic gases. The stream of cyclic gases then flows in the opposite direction through the isolated portion of the filter medium on which the solids have been deposited, picks up said deposited solids and carries them to the separator 12.

In the separator 12 at least the major portion of the solid particles are recovered and they are withdrawn therefrom at 14 into a suitable receptacle. Any residual suspended solids not separated from the cyclic gases by the separator 12 are carried back into the separator 7 through conduits 19 and 20 and are deposited on the filter medium therein on the opposite side from that on which the solids from the stream of effluent gases are deposited. As the filter medium on which the residual solids from the separator 12 are deposited rotates back into the path of the stream of effluent gases, such residual solids are again picked up by the effluent gases and carried thereby, together with any solids not previously separated therefrom, to the filter 9.

In filter 9, which may be substantially identical with filter 7, all residual solids remaining in the effluent gases are transferred to the stream of air, or other reactive or regenerative gases, passing therethrough in the opposite direction, and are returned thereby to the burner 1.

This final separating operation advantageously may be combined in a novel manner with the previously mentioned heat recovery operation whereby the incoming reacting gaseous medium is preheated by heat extracted from the effluent gases. Though this heat exchange is not an essential part of our suspension recovery process, it may advantageously be combined therewith by our unique arrangement of means whereby this heat recovery is effected as an integral part of the final suspension recovery step. By this arrangement we have effected an economically feasible unitary process for the regeneration of catalytic material or the like, which is capable of being carried out in relatively simple, inexpensive apparatus which is compact and requires little attention.

Where the filters 7 and 9 are to be used solely for transferring the suspended solid particles from one gas stream to another, a filter of the conventional rotary disc or drum type may be used providing sufficient area is allowed for the reverse flow of gases. Due care must be taken, of course, in the selection of the filtering medium to choose one capable of withstanding the temperature conditions and of such mesh as will retain the particular solid particles to be recovered. However, we prefer to use a rotary filter in which the filtering medium consists of a permeable bed of solid, porous or granular filtering material.

One type of readily available apparatus eminently satisfactory for this purpose is the conventional rotary heat exchanger. These heat exchangers are readily adapted to the filtering operation by substituting a bed of conventional finely divided granular or porous filtering material for the customary heat-absorbing surfaces.

One advantage of the use of a rotary filter of the type last referred to is its adaptability to a combined filtering and heat-exchanging operation. By supplementing the customary heat-exchanging surfaces in the several sections of the rotary heat exchanger by beds of granular or porous filtering material or other filtering medium on that side of the segmental chambers where the effluent gas enters, we are enabled in the same apparatus and operation to effect not only a transfer of the suspended solids from one gas stream to the other but also to effect a transfer of heat units from the stream of effluent gases to the stream of incoming fresh gases which is desirable with respect to filter 9. By thus combining this filtering step with a heat-exchanging operation, a substantial saving in the cost of equipment and the space occupied thereby is effective.

Where the heat-exchanging step is thus combined with the filtering step, the material in the several sectional chambers of the conventional rotary heat exchanger may advantageously consist of a bed of considerable thickness comprising a coarse refractory material, such as firebrick, capable of storing and conserving considerable heat supplemented by a bed of material of increasing fineness toward the end of the chambers where the effluent gases enter. The rotor of such apparatus may operate in either a vertical plane, as shown in the drawing, or in a horizontal plane. It will be understood, of course, that where the rotor operates in a vertical plane supporting means will be provided to hold the bed of material in place.

The operation of burners for regenerating the catalyst is well known in the art and need not here be described. In such operation it is necessary to maintain in the reaction zone a uniform temperature not exceeding a maximum yet sufficiently high to maintain combustion of the contaminating material in the catalyst. The maximum allowable temperature depends on the particular catalyst being treated. Normally the spent catalyst is passed through the burner in relatively small particles ranging roughly from the size of a chestnut to a very fine powder. If the material coming from the catalytic process is in larger particles it may be reduced in size by crushing or the like before being passed to the burner.

In the foregoing description of our present invention we have emphasized its usefulness with respect to the recovery of catalyst suspended in the effluent gases from a regenerative process. It will be appreciated, however, that it is likewise applicable to the recovery of finely divided catalyst which may be carried off in suspension in gaseous products issuing from the catalytic process where it is desirable to return such catalyst to the burner for regeneration. It is also applicable to other purposes wherein it is desired to recover suspended solid particles from relatively large volumes of gases. The invention is particularly useful in the regeneration of kieselguhr, fuller's earth, aluminum silicate gels and the like, either alone or in admixture with various metals or metal salts.

We claim:

1. The process for the recovery of solid particles suspended in effluent gases from a zone of reaction comprising alternately passing a stream of the effluent gases and an independent cyclically flowing stream of gases in opposite directions through progressive sections of the filtering medium of a continuously operating filter, the filtering medium of which is of sufficient fineness to retain the major portion of the solid particles, whereby the solid particles deposited on the respective sections thereof from the effluent gases are carried off by the independent stream of cyclically flowing gases, centrifugally separating the solid particles from the cyclically flowing gases, alternately passing the stream of effluent gases from the said filtering operation together with any residual solid matter suspended therein and a stream of reactive gases to be passed to the zone of reaction in opposite directions through progressively advancing sections of the filtering medium of a second continuously operating rotary filter, the filtering material of which is of sufficient fineness to retain the residual solid particles, whereby the residual solid particles deposited thereon from the effluent gases are carried off by the stream of reactive gases, and passing the stream of reactive gases together with the residual solid particles suspended therein to the zone of reaction.

2. The process for the recovery of finely divided catalyst suspended in the effluent gases from a catalytic process comprising alternately passing a stream of the effluent gases and an independent cyclically flowing stream of gases in opposite directions through progressive sections of the filtering medium of a continuously operating filter, the filter medium of which is of sufficient fineness to retain the major portion of the suspended particles, whereby the particles deposited on the respective sections thereof from the effluent gases are carried off by the independent stream of cyclically flowing gases, centrifugally separating the major portion of the suspended particles from the cyclically flowing gases, alternately passing the stream of effluent gases from the said filtering operation together with any residual solid particles suspended therein and a stream of reactive gases to be passed to a zone of regeneration of the catalyst in opposite directions through progressively advancing sections of the filtering medium of a second continuously operating filter, the filtering medium of which is of sufficient fineness to retain the residual solid particles, whereby the residual solid particles deposited thereon from the effluent gases are carried off by the stream of reactive gases, and passing the stream of reactive gases together with the residual particles of catalyst suspended therein to the zone of regeneration.

3. The process for the recovery of solid particles suspended in effluent gases from a zone of reaction comprising transferring the major portion of the suspended solid particles from the effluent gases to an independent stream of gases by alternately passing a stream of the effluent gases and the independent stream of gases in opposite directions through a filtering medium, separating said solid particles from the latter gas stream, alternately passing the stream of effluent gases from which the major portion of the suspended particles has been removed and a stream of reactive gases to be passed to the zone of reaction in opposite directions through progressively advancing sections of the filtering medium of a continuously operating filter, the filtering medium of which is of sufficient fineness to retain the residual solid particles, whereby the residual solid particles deposited thereon from the effluent gases are carried off by the stream of reactive gases, and passing the stream of reactive gases together with the residual solid particles suspended therein to the zone of reaction.

4. The process for the recovery of finely divided catalyst suspended in the effluent gases from a catalytic process comprising transferring the major portion of the suspended catalyst from the effluent gases to an independent stream of gases by alternately passing a stream of the effluent gases and the independent stream of gases in opposite directions through a filtering medium, separating the suspended catalyst from the latter gas stream, alternately passing the stream of effluent gases from which the major portion of the suspended catalyst has been removed together with the residual catalyst suspended therein and a stream of reactive gases to be passed to a zone of regeneration of the catalyst in opposite directions through progressively advancing sections of the filtering medium of a continuously operating filter, the filtering medium of which is of sufficient fineness to retain the residual suspended catalyst, whereby the particles of catalyst deposited thereon from the effluent gases are carried off by the stream of reactive gases, and passing the stream of reactive gases together with the residual catalyst suspended therein to the zone of regeneration.

5. The process for the recovery of finely divided catalyst suspended in the effluent gases from a catalytic process comprising transferring the major portion of the suspended catalyst from the effluent gases to an independent stream of gases by alternately passing a stream of the effluent gases and the independent stream of gases in opposite directions through a filtering medium, centrifugally separating the major portion of the catalyst suspended therein from the independent stream of gases and returning any residual catalyst suspended therein to the stream of effluent gases from which the major portion of the suspended catalyst has been separated by repassing the independent stream of gases containing said residual catalyst through the filtering medium as previously specified, alternately passing the stream of effluent gases from said filtering operation together with the residual catalyst suspended therein and a stream of reactive gases to be passed to a zone of regeneration of the catalyst in opposite directions through progressively advancing sections of the filtering medium of a continuously operating filter, the filter medium of which is of sufficient fineness to retain the residual particles of catalyst, whereby the particles of catalyst deposited thereon from the effluent gases are carried off by the stream of reactive gases, and passing the stream of reactive gases together with the residual catalyst suspended therein to the zone of regeneration.

6. Process for the recovery of solid particles suspended in effluent gases from a zone of reaction comprising transferring the major portion of the suspended solid particles from the effluent gases to an independent stream of gases by alternately passing a stream of the effluent gases and the independent stream of gases in opposite directions through a filtering medium, separating the major portion of the solid particles suspended therein from the independent stream of gases and returning any residual solid particles suspended therein to the stream of effluent gases from which the major portion of the suspended solid particles has been separated by repassing the independent stream of gases containing such residual solid particles through the filtering medium as just specified, alternately passing the stream of effluent gases from said filtering operation together with the residual solid particles suspended therein and a stream of reactive gases to be passed to the zone of reaction in opposite directions through progressively advancing sections of the filtering medium of a continuously operating filter, the filtering medium of which is of sufficient fineness to retain the residual solid particles whereby the solid particles deposited thereon from the effluent gases are carried off by the stream of reactive gases and passing the stream of the reactive gases together with the residual solid particles suspended therein to the zone of reaction.

7. Apparatus for the recovery of solid particles from suspension in the effluent gases from a zone of reaction to which a reactive gaseous medium is supplied comprising in combination a reaction chamber and two continuously operating filters, each filter being of the type adapted to rotate so that progressive isolated portions of the filtering medium thereof alternately lie across the path of one of two oppositely flowing independent gas streams without substantial commingling of said gas streams, the filtering medium of the first filter being of sufficient fineness to retain the major portion of the solid particles to be recovered and that of the second filter being finer than that of the first, connections adapted to convey the effluent gases from the reaction chamber through the first and second filters, consecutively, connections leading from a source of supply of the reactive gaseous medium through the second filter of the series in the direction opposite to the flow of said effluent gases therethrough and from thence to the reaction chamber, a separator adapted to separate suspended solids from a gaseous medium and having an inlet for the gaseous suspension and outlets for the cleaned gases and the separated solid particles, respectively, a closed connection leading from the gas outlet of the separator through the first filter of the series in the direction opposite to the flow of said effluent gases therethrough to the inlet of the separator and gas propulsion means in said closed connection.

8. Apparatus for the recovery of solid particles from suspension in the effluent gases from a zone of reaction to which a reactive gaseous medium is supplied comprising in combination a reaction chamber and two continuously operating filters, each filter being of the type adapted to rotate so that progressive isolated portions of the filtering medium thereof alternately lie across the path of one of two oppositely flowing independent gas streams without substantial commingling of said gas streams, the filtering medium of the first filter being of sufficient fineness to retain the major portion of the solid particles to be recovered and that of the second filter being finer than that of the first, connections adapted to convey the effluent gases from the reaction chamber through the first and second filters, consecutively, connections leading from a source of supply of the reactive gaseous medium through the second filter of the series in the direction opposite to the flow of said effluent gases therethrough and from thence to the reaction chamber, a centrifugal separator adapted to separate suspended solids from a gaseous medium and having an inlet for the gaseous suspension and outlets for the cleaned gases and the separated solid particles, respectively, a closed connection leading from the gas outlet of the separator through the first filter of the series in the direction opposite to the flow of said effluent gases therethrough to the inlet of the separator and gas propulsion means in said closed connection.

OLIVER F. CAMPBELL.
HARRY L. PELZER.